Figure 1:
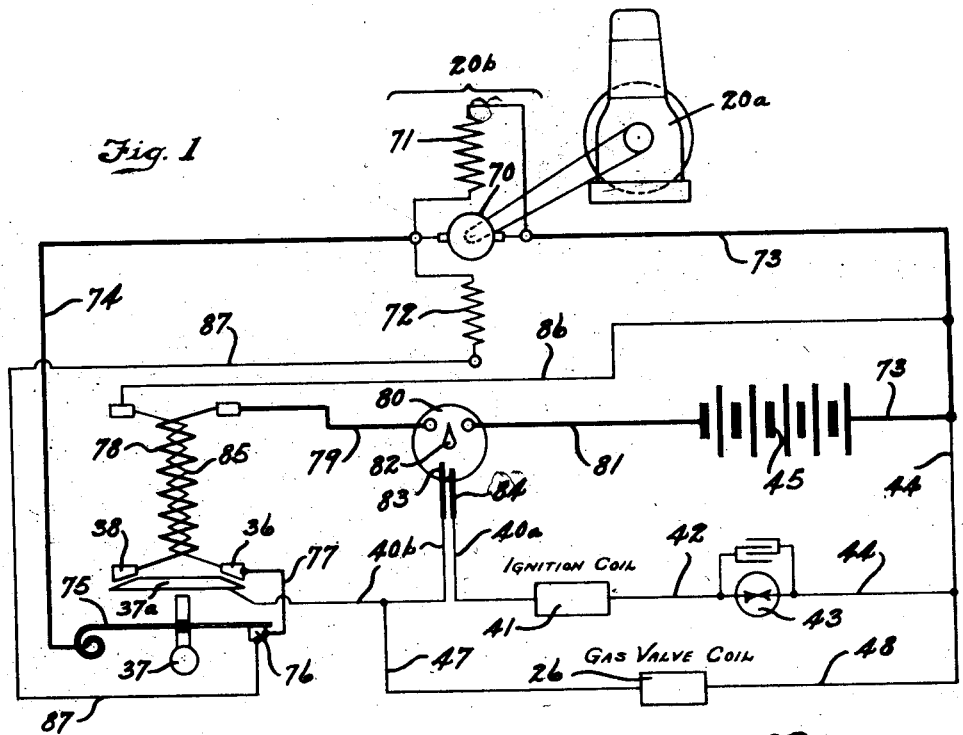

June 25, 1929.  C. F. KETTERING ET AL  1,718,238
SYSTEM OF GAS CONTROL
Original Filed Feb. 3, 1917

Inventors
Charles F. Kettering
and William G. Chryst
By their Attorneys

Patented June 25, 1929.

1,718,238

UNITED STATES PATENT OFFICE.

CHARLES F. KETTERING AND WILLIAM A. CHRYST, OF DAYTON, OHIO, ASSIGNORS TO DELCO-LIGHT COMPANY, OF DAYTON, OHIO, A CORPORATION OF DELAWARE.

SYSTEM OF GAS CONTROL.

Original application filed February 3, 1917, Serial No. 146,542. Divided and this application filed July 17, 1924. Serial No. 726,630.

The present invention relates to fuel control systems for internal-combustion engines and particularly for systems of control for gaseous fuel, such as natural gas.

This application is a division of our co-pending application Serial No. 146,542, filed February 3, 1917, which has matured into Patent No. 1,507,292, issued September 2, 1924.

One object of the invention is to admit gaseous fuel automatically to the engine intake when the engine is in the process of being started.

A further object is to shut off the supply of fuel automatically when the engine stops either by reason of control by an operator, by reason of the operation of an automatic stopping device, or by accident such as a temporary discontinuance in the gas supply or failure of the ignition apparatus to function. In any event the dangerous escape and waste of gas through the engine is prevented.

One manner of carrying out these objects is to provide the engine intake with a valve normally closing said intake when the engine is at rest, and to provide that when the ignition apparatus is brought into operation at the starting of the engine this valve will be automatically opened and will remain open substantially continuously during the operation of the engine, so that the flow of gas into the engine intake will not be affected by the operation of the ignition system. Then it is provided that when the engine is stopped by the ignition system becoming inoperative, this valve shall automatically close.

In this connection it is provided that the tendency for the supply of gas to flow into the engine intake shall assist in closing the valve upon the stopping of the engine.

In carrying out the foregoing objects in connection with a battery charging system including an internal-combustion engine connected with a dynamo operable as a motor on current from a battery to start the engine or as a generator to charge the battery, it is preferably provided that the controller which connects the battery with the dynamo for engine starting purposes shall also connect the battery with the ignition apparatus and with an electrically-operated valve to open up the engine intake to the fuel supply. It is provided that the controller shall maintain these connections during the generating operation of the dynamo, but that the controller shall operate automatically upon a tendency for the battery to discharge through the dynamo, to break these connections to prevent battery discharge and the escape and waste of fuel. This battery discharge would tend to occur upon a certain decrease in engine speed or upon failure of the dynamo to function properly at normal engine speed.

Further objects and advantages of the present invention will be apparent from the following description, reference being had to the accompanying drawings, wherein a preferred embodiment of one form of the present invention is clearly illustrated.

Figure 2:
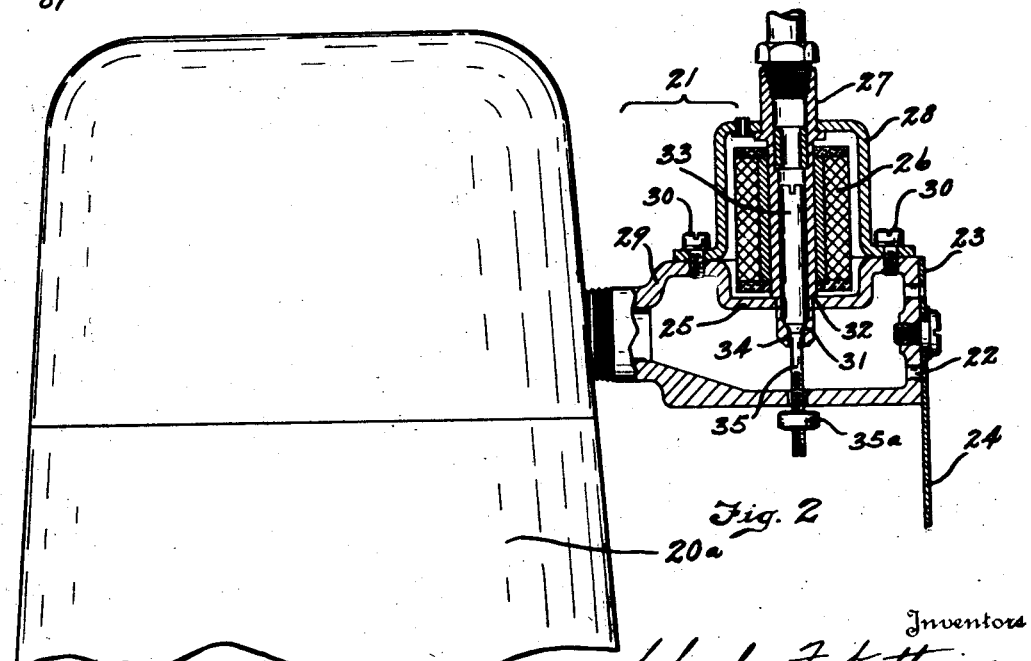

In the drawings:

Fig. 1 is a wiring diagram showing the relation of the invention to ignition and battery charging circuits; and Fig. 2 is a detail sectional view of one form of valve mechanism for embodying the present improvements.

Referring to the drawings, the numeral 20 designates a combined gas engine and electric unit of substantially the same type as that shown, described and claimed in our Patent No. 1,341,327, dated May 25, 1920, and our co-pending application Serial No. 120,098, filed September 14, 1916. The unit 20 includes engine 20$^a$ and dynamo 20$^b$.

The present type of engine, however, instead of operating on fuel such as gasoline, kerosene, etc., is especially adapted to operate with natural gas as fuel. That is, in communities wherein natural gas is plentiful and of low cost, it has been found advantageous to provide for the use of this gas as a fuel for the engine.

It is particularly advantageous where fuel of this type is employed, that the flow thereof to the engine be automatically controlled. That is, as soon as it is desired to bring the engine into operation, the flow of gas should be readily permitted. However, it is of greater importance that as soon as the engine ceases to operate, either through being stopped by an attendant or by being stopped inadvertently, the flow of gas should be effectually shut off and prevented from escaping to the engine, which is then in a non-operative condition.

The numeral 21 designates as a whole a fuel mixer including a casing 29 provided with an air inlet 22 which is manually controlled by means of the shiftable valve disc 23, provided with a handle 24. This casing 29 is preferably of such conformation that a depression is formed in one side thereof, as at 25, and is adapted to provide a recess into which the solenoid coil 26 may extend. This coil 26 is covered by means of a housing 28, suitably secured to the casing 29, by means of the screws 30, suitable openings being formed at the top of the housing, in order to permit the entrance and exit of electric terminals, to connect the solenoid coil 26 with suitable circuit connections described hereinafter.

A nozzle 27 extends through the housing 28, down through the coil 26, the end of said nozzle projecting through the casing 29 and communicating with the interior of said casing. This nozzle 27 is provided with a shoulder 32, which limits the extent of downward movement of the nozzle by abutting against the wall of the casing 29. The outer end of nozzle 27 may be connected with a suitable source of fuel gas supply by a pipe or other means. Concentric with this nozzle, and adapted to slidably fit therein, is a core 33 provided with a reduced head or valve portion 34. This valve portion 34 has a ground fit with a valve seat portion 31 provided in the nozzle 27, which will effectually prevent the passage of gas from the nozzle to the mixing chamber, at such times as the core is in the position shown in Fig. 2.

It is apparent that the nozzle 27 supports the coil 26 and that the housing 28 assists in supporting the nozzle 27.

An extended end portion 35 of the core 33 projects through the open end of the nozzle at 31 and through the opposite side of the casing 29 which acts as a guide for the core. The end portion 35 is threaded to receive a nut 35ª which serves as a stop to limit the upward movement of the core 33. By changing the position of nut 35ª, the amount of opening of the gas valve may be varied to vary the speed of the engine. In this manner the power plant may be adjusted to vary the electrical output.

As has been stated above, the solenoid coil 26 has certain circuit connections. It will be seen that as soon as the ignition circuit is closed by the operation of the handle 37, the coil 26 will become energized and thereby attract the core 33 and raise the same, so as to open the lower end of the nozzle 27 at 31, and permit gas to pass through the nozzle into the interior of the mixing chamber. This gas will of course become mixed with the air which is passed through the air inlet valve 22 and will then be sucked into the engine cylinder to form the fuel charge.

As has been clearly set forth in our above-mentioned copending application, Serial No. 120,098, filed September 14, 1916, the handle 37 controls not only the closing of the ignition circuit, but also the operation of the electric unit to start the engine.

Fig. 1 shows the controller disclosed in the aforesaid application for connecting the battery with the dynamo, as well as for connecting the battery with the ignition apparatus and with the gas valve coil.

As disclosed in said application, and referring to Fig. 1, the dynamo 20ᵇ includes armature 70, shunt field 71 and series field 72, and is connected by wire 73 with battery 45, and by wire 74 with a spring contact 75, which supports handle 37 but is insulated therefrom. Contact 75 normally engages contact 76 which is connected by wire 77 with contact 36. Contact 38 is connected with a series magnet coil 78 connected by wire 79 with ampere-hour-meter 80 connected by wire 81 with battery 45. Ampere-hour-meter 80 is provided with hand 82 actuated by said meter 80 to rotate clockwise during battery charging and to move a switch contact 83 out of engagement with contact 84 after a certain amount of charging has taken place.

Contact 36 is connected with a shunt magnet coil 85 connected by wire 86 with wire 73. Series field 72 is connected by wire 87 with contact 76. Coil 41 is connected by wire 40ª with contact 84. Wire 40ᵇ connects contact 83 and wire 47 with contact 37ª which is arranged to engage contacts 36 and 38.

To start the engine, handle 37 is moved to separate contact 75 from contact 76 whereupon the short circuit around series field 72 will be broken, and to move contact 37ª into engagement with contacts 36 and 38, whereupon the dynamo 20ᵇ will be connected with the battery 45 and will operate as a cumulative compound motor. At the same time the ignition devices 41, 43 and the gas valve coil 26 will be connected with the battery. Ignition for the engine will be provided and the gas valve will be opened.

After the engine becomes self-operative and the dynamo generates a voltage in excess of battery voltage, the magnet coils 78 and 85 will act cumulatively to hold the contact 37ª in engagement with contacts 36 and 38 in order to maintain the circuit connection between the battery and the dynamo during the battery charging operation.

In case the engine speed should decrease below a certain amount, the coils 78 and 85 will act in opposition to one another with the result that the contact 37ª will no longer remain in engagement with contacts 36 and 38 but will drop away therefrom to disconnect the battery from the dynamo, from the ignition apparatus and from the gas valve coil. When this occurs the gas valve will close automatically and prevent escape of gas through the engine or through the fuel mixer.

Stopping of the engine might occur in case of a substantial decrease in the gas fuel supply and would occur if the supply were cut off entirely, as often happens in the case of the supply of natural gas. If, after the engine had stopped, and before the engine could be started again, the gas should come on again, there would be an escape of gas into the surrounding atmosphere, which would be dangerous and wasteful were it not for the provision of means for automatically shutting off the supply of gas to the engine, as herein provided for.

When the battery has been charged a certain amount the ampere-hour-meter hand 82 causes the ignition circuit to be broken by separating contacts 83, 84. The engine will stop for lack of ignition. Escape of gas will be prevented by the operation of the automatic gas valve as previously described.

It will be noted that these electrical connections are such that the gas valve coil is controlled independently of the ignition timer. This arrangement is advantageous in that the gas valve remains continuously open during the operation of the engine to permit gas to flow substantially uninterrupted to the intake of the engine. The gas is therefore present in the engine intake under substantially undiminished pressure to be admitted to the cylinder at the proper time.

While the embodiment herein shown and described constitutes a preferred embodiment of one form of the invention, it is to be understood that other forms might be adopted and various changes and alterations made in the shape, size and proportion of the elements therein without departing from the spirit and scope of the invention.

What is claimed is as follows:

1. In a fuel control system, the combination with an internal combustion engine; of a dynamo connected with the engine; a storage battery; an electrically operated valve controlling the passage of engine fuel; manual means for connecting the battery with the dynamo and valve to cause the dynamo to operate as a motor to crank the engine and to open the valve; means responsive to engine operation for maintaining the connections between the dynamo, valve and battery and for automatically interrupting said connections in case of engine failure.

2. In a fuel control system, the combination with an internal combustion engine having a fuel intake; of a valve controlling the passage of fuel to the intake; a starting device for the engine; ignition apparatus for the engine; means for causing the valve to open and the starting device to be operative; means for rendering the ignition inoperative; and means responsive to the operation of the last named means for permitting the valve to close.

3. In a fuel control system, the combination with an internal combustion engine having a fuel intake; of a valve controlling the passage of fuel to the intake; a starting device for the engine; electrical ignition apparatus for the engine; a switch including a manually operable member for rendering the starting device operative; and electromagnetic means responsive to engine operation for maintaining the switch closed; a current source; an electromagnet for holding the valve open; circuits closed by said switch for connecting the ignition apparatus and valve magnet with the current source; and a second switch for interrupting the ignition circuit to stop the engine.

4. In a fuel control system, the combination with an internal-combustion engine having a fuel intake; of a valve for controlling the passage of fuel to the intake; an electromagnet for opening the valve; a starting device for the engine; a source of current; and control means for connecting said starting device and electro-magnet with the source for starting the engine, said control means including means responsive to engine operation for maintaining the circuit of the electro-magnet closed, said last means being arranged to automatically disconnect the starting device and electro-magnet from the source in case of engine failure.

5. In a fuel control system, the combination with an internal-combustion engine having a fuel intake; of a valve for controlling the passage of fuel to the intake; a starting device for the engine; a source of current; and control means for connecting said starting device with the source for starting the engine, said control means including means responsive to engine operation for maintaining the valve open, said last means being arranged to automatically disconnect the starting device from the source and adapted to permit the valve to close in case of engine failure.

6. In a fuel control system, the combination with an internal-combustion engine having a fuel intake; of a valve controlling the passage of fuel to the intake; a starting device for the engine; a control circuit for the engine; means for causing the valve to open and the starting device to be rendered operative and the control circuit to be rendered operative; means for rendering the control circuit inoperative; and means responsive to the operation of the last-named means for permitting the valve to close.

In testimony whereof we hereto affix our signatures.

CHARLES F. KETTERING.
WILLIAM A. CHRYST.